June 26, 1928.

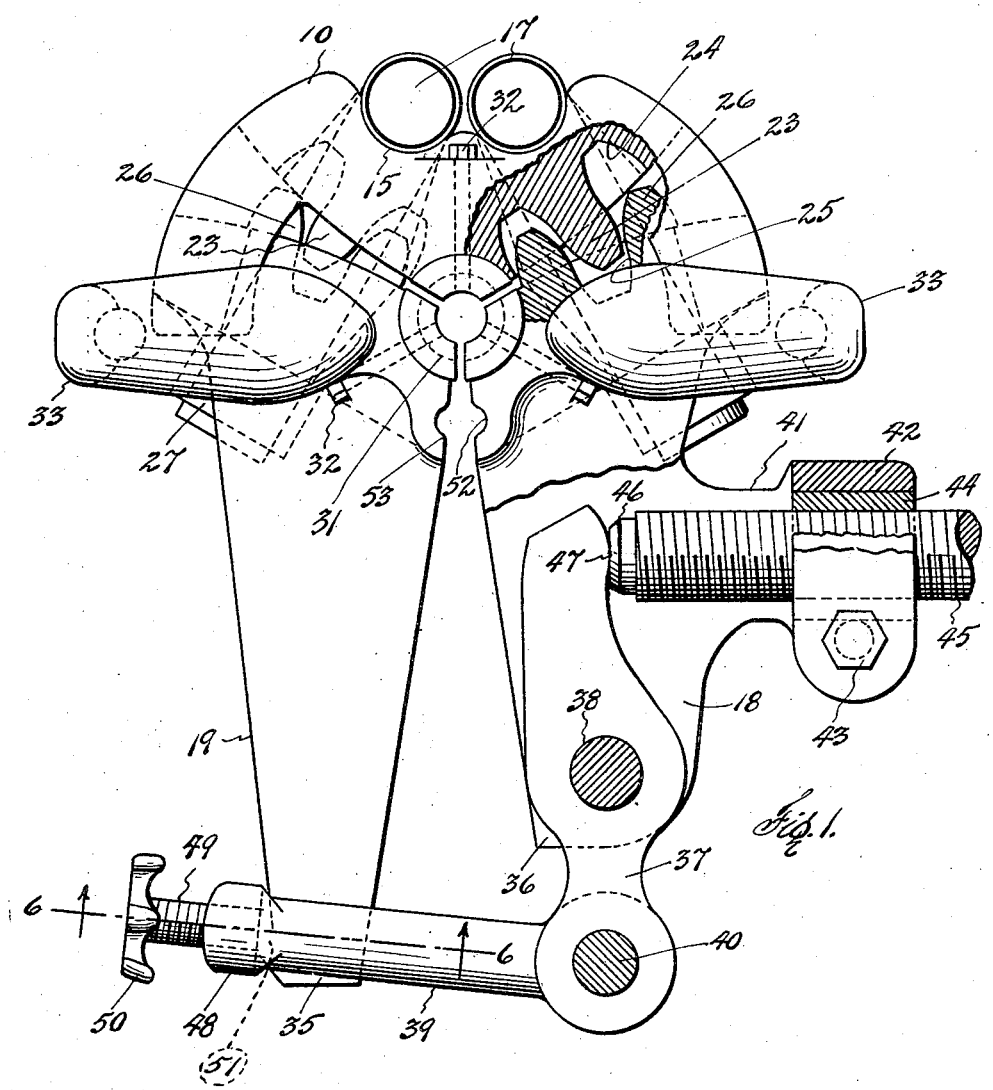

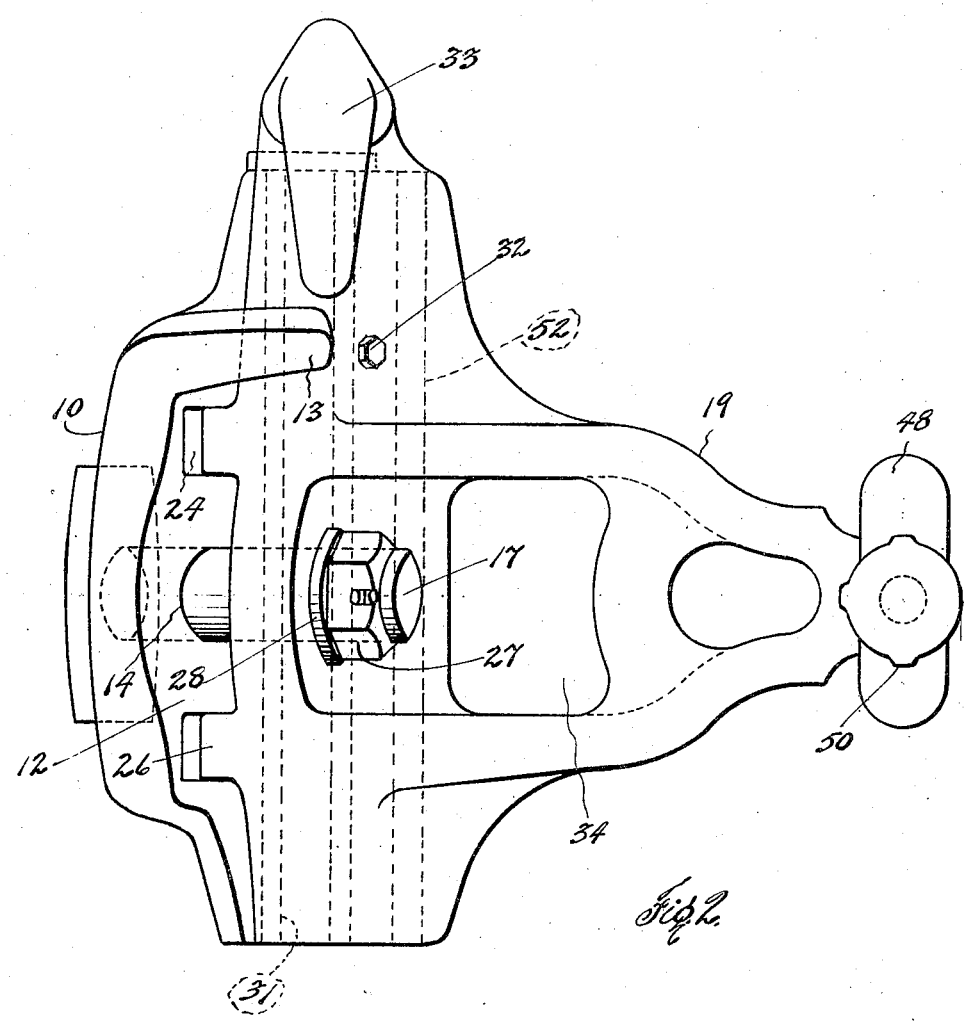
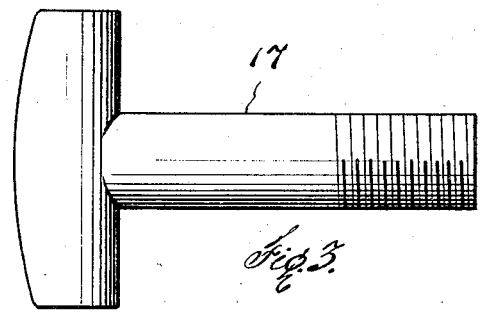

F. E. CROTTO 1,674,952

WIRE LINE CLAMP

Filed Feb. 25, 1927

4 Sheets-Sheet 3

Inventor
F. E. Crotto

By Jack A. Schley

Attorney

June 26, 1928.
F. E. CROTTO
WIRE LINE CLAMP
Filed Feb. 25, 1927
1,674,952
4 Sheets-Sheet 4
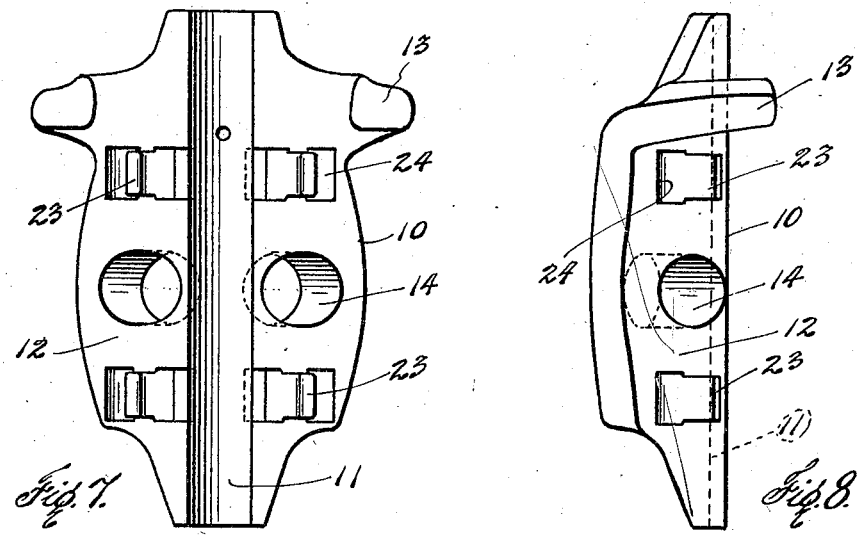
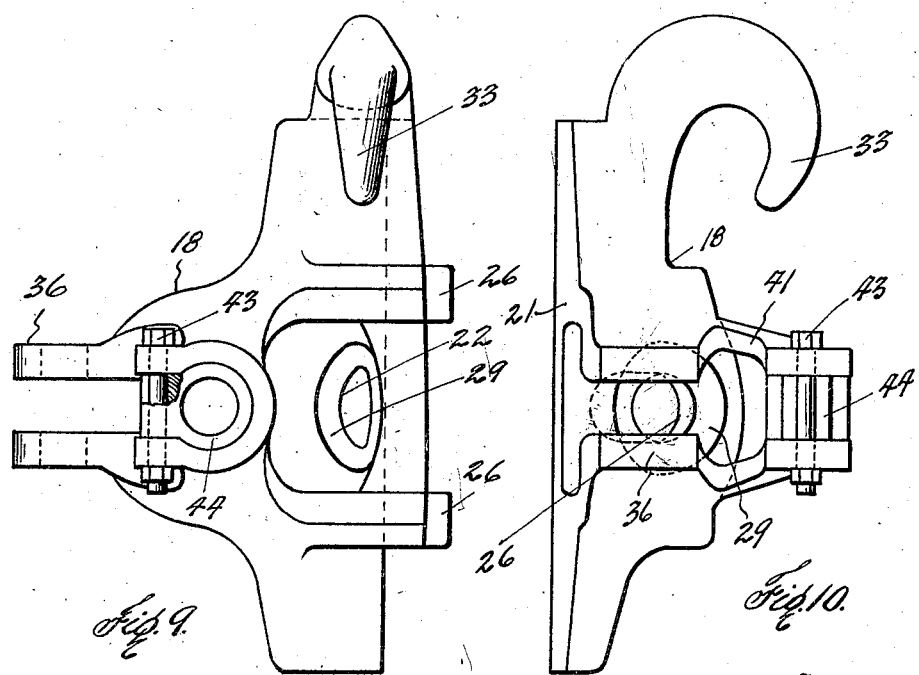
Inventor
F. E. Crotto
By Jack A. Athley
Attorney Patented June 26, 1928.

1,674,952

UNITED STATES PATENT OFFICE.

FRANK E. CROTTO, OF TULSA, OKLAHOMA, ASSIGNOR TO WESTERN SUPPLY COMPANY, OF TULSA, OKLAHOMA, A CORPORATION OF OKLAHOMA.

WIRE-LINE CLAMP.

Application filed February 25, 1927. Serial No. 170,828.

This invention relates to new and useful improvements in wire line clamps.

The object of the invention is to provide a swivel mounting for each of the jaws whereby radial pressures are equalized and the slips are caused to wear evenly as well as maintain their concentric gripping faces and exerting equal pressures thus obviating eccentric faces on the slips and unequal pressures along the sides of the line.

A further object of the invention is to mount the jaws so that the gripping portions of the clamp may decline or swing from their vertical planes so as to accommodate the faces of the slips to splices or other irregularities in the line.

Another object of the invention is to employ T-shaped bolts or their equivalents whereby amplified perpendicular bearings are provided to prevent the shank of the bolts from swinging in a vertical plane, thus maintaining the jaws in their horizontal positions.

Another important object of the invention is to provide positive intermeshing connections between the jaws or arms and the body or head, whereby the arms are synchronized in their movements and their relative positions maintained.

A further object of the invention is to provide concavo-convex seats in the clamp arms for gripping sand lines of different diameters without the use of bushings.

A particular object of the invention is to provide in connection with the gate and its operating parts a removable bushing which carries the screw threads and which may be replaced when worn, together with means whereby an amplified leverage is obtained and more positive and delicate adjustments are secured.

As the clamping slips are subject to wear, another object of the invention is to provide a screw in connection with the closing gate which may be adjusted to compensate the wear of the slips and to maintain the leverage angles.

A construction designed to carry out the invention will be hereinafter described, together with other features of the invention.

Figure 4:
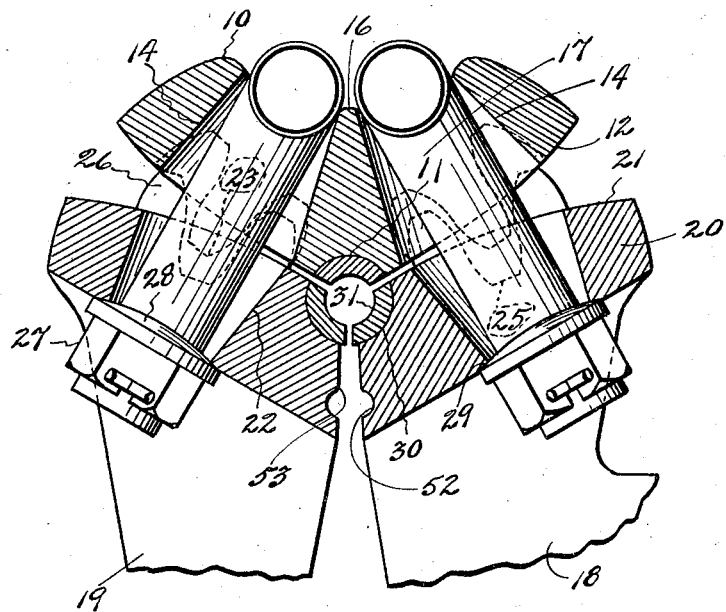
Figure 5:
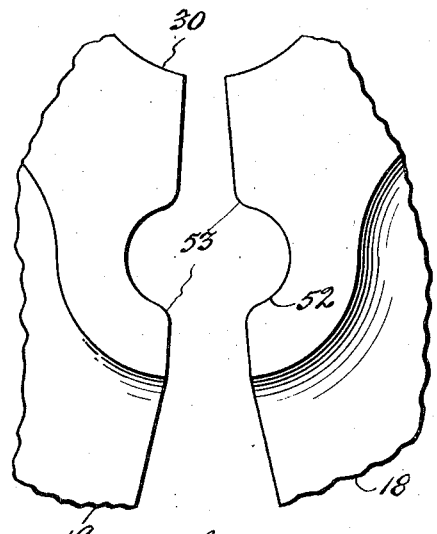
Figure 6:
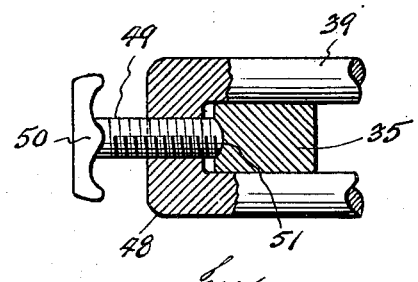

The invention will be more readily understood from a reading of the following specification and by reference to the accompanying drawings, in which an example of the invention is shown and wherein:

Fig. 1 is a plan view of a clamp constructed in accordance with my invention, portions of the view being in section, Fig. 2 is a side elevation of the same, Fig. 3 is a side elevation of one of the T-bolts, Fig. 4 is a partial horizontal cross-sectional view, Fig. 5 is a partial plan view showing the sand line seats, Fig. 6 is a transverse sectional view taken on the line 6—6 of Fig. 1, Fig. 7 is a reduced front elevation of the head, Fig. 8 is a side elevation of the same, Fig. 9 is a reduced side elevation of one of the clamp arms, and Fig. 10 is a front elevation of the same.

In the drawings the numeral 10 designates a vertical head having a central vertical concaved seat 11 in its front side. Slightly convex faces 12 diverge from each side of the groove. At the upper outer corner of each face forwardly projecting lugs 13 are provided. At the central portion of each face I provide bolt slots 14 extending through the head to vertical seats 15 on the rear side of the head, as is best shown in Fig. 4. It will be seen that the slots 14 are flared transversely and forwardly and diverge from a central vertical rib 16 on the rear side of said head.

T-shaped bolts 17 have their heads disposed vertically within the seats 15, while their shanks extend through the slots. One of these bolts is illustrated in Fig. 3 and it is given a structure making for great strength. The slots 14 are slightly in excess vertically of the diameter of the bolt, but transversely are considerably in excess of said diameter. This permits the bolts to swivel and to undergo an amplified horizontal swing, but owing to the contact of each T-head of the bolt with its seat 15, said bolt can not swing vertically unless the head is displaced from the seat and then only to a limited extent.

Clamp arms 18 and 19 have vertical jaws 20 at their inner ends, each provided with a face 21 slightly convex transversely of the jaw. The faces of the jaws are complementary to the faces 12 of the head so as to rock thereon. Each jaw has a bolt slot 22 which is flared transversely toward the face 21 and oppositely to the flare of the slot 14. The bolts 17 extend through the slots 22 whereby the jaws are swiveled on said bolts. The slots 22 are slightly larger vertically than the diameter of the bolts so that said jaws may move in all directions.

Above and below the slots 14 I provide on each face 12 of the head a single outwardly extending tooth 23 and on each side of each tooth a socket 24. On each face of each jaw I provide above and below the slot 22 a socket 25 for receiving the complementary tooth 23 and on each side of said socket teeth 26 for engaging in the sockets 24. On the end of each bolt I mount a nut 27 having a convex boss 28 on its inner end engaging in a seat 29 surrounding the slot 22.

The nuts are screwed up so as to confine the teeth in the sockets and to leave a limited clearance between the faces 12 and 21 so that the jaws are free to swivel on the bolts and to swing a sufficient distance horizontally to open the jaws. The teeth maintain the jaws in their proper relation and synchronize their swinging movements. The nuts may be suitably keyed or otherwise fastened on the bolts.

Along the inner corner of each jaw I provide a vertical concaved groove or seat 30 complementary to the seat 11. In each of these three seats I fasten vertical slips 31 by means of machine bolts 32 passing through the parts. These slips may be replaced when worn. It will be seen that the swiveled and synchronized mounting of the jaws together with the head will permit the three slips to be applied to the drill line with equal pressure, thus making for even wear both on the drill line and the slips. When the arms are loosened so as to permit the drill line to pass vertically through the clamp, the swiveled mounting of the parts will permit movement of the slips in vertical arcs of sufficient amplitude to allow splices and other irregularities to pass through without opening the clamp.

Each jaw is provided with outwardly curved hooks 33 overhanging the ends of the lugs 13 of the head, said lugs thus acting as keepers for the links (not shown) with which the hooks are engaged for suspending the clamp. The arm 19 is provided with a longitudinal slot 34 into which the bolt 17 and nut 27 extend. The outer end of the arm is reduced in thickness and shouldered to form a keeper 35.

The arm 18 is bifurcated longitudinally and provided at its outer end with ears 36. A gate lever 37 is pivoted on a pin 38 between said ears. A yoke shaped gate 39 has its ends straddling the outer end of the lever 37 and pivoted thereon by a pin 40. A yoke 41 extends outwardly from the arm 18 intermediate its ends and carries an integral split collar 42 on its outer end provided with a clamp bolt 43. A screw threaded bushing 44 is removably fastened in this collar and is internally screw-threaded to receive a screw 45.

It will be seen that when the threads of the bushing become worn it may be replaced with a new bushing and replacement is thus made economical.

The inner end of the screw is reduced and provided with a bearing boss 46. The outer end of the screw may be provided with a handle or any other suitable operating member (not shown.) The gate lever 37 has considerably more of its length projecting inwardly from the pin 38 than it has extending outwardly and is provided on its inner end with a nose 47 positioned to be engaged by the boss 46 of the screw. It will be seen that by reason of the advantage and leverage an adjustment of the screw will swing the lever so that a comparatively fine adjustment of the gate 39 will be made. By using coarse threads on the screw 45, the gate may be moved to a very slight degree upon each turn of said screw.

The gate 39 has a cross bar 48 at its swinging end in which an adjusting screw 49 is mounted. The screw 49 has a notched head 50 and its inner end is adapted to engage in a seat 51 in the edge of the keeper 35. It is obvious that by rotating the screw 49 a very fine adjustment of the arms may be had and also the screw may be adjusted so as to bring the arms closer together when the gate is closed than if merely the gate was used.

In each jaw I provide concavo convex vertical seats 52 for gripping a sand line. The vertical edges 53 of these seats, as is shown in Fig. 5, are rounded so as not to pinch the sand line and also to coact in accommodating sand lines of different diameters.

Various changes in the size and shape of the different parts, as well as modifications and alterations, may be made within the scope of the appended claims.

What I claim, is:

1. In a line clamp, a head having a line clamping medium, a pair of co-acting clamping members loosely connected to the head and having line clamping mediums co-acting with the line-clamping medium of the head.

2. In a line clamp, a head having a line clamping medium, a pair of co-acting clamping members loosely connected to the head having line clamping mediums co-acting with the line-clamping medium of the head, and means for holding the members in line clamping positions.

3. In a line clamp, a head, a line clamping slip carried by the head, a pair of co-acting arms loosely mounted on the head, and line-clamping slips carried by the arms and co-acting with the slip of the head.

4. In a line clamp, a head having a cable line receiving portion, and a pair of clamping members loosely mounted on to said head, each member having an arcuate cable line clamping element co-acting with the line receiving portion of the head when the said members are swung together.

5. In a line clamp, a head having a cable line receiving portion, a pair of clamping members loosely mounted on to said head, each member having an arcuate cable line clamping element co-acting with the line receiving portion of the head when the said members are swung together, and means for drawing said members together.

6. In a line clamp, a head having a cable clamping element, clamping members each loosely mounted on the head on each side of the clamping element, and cable clamping means carried by said members on each side of the clamping element of the head.

7. In a line clamp, a head having a cable clamping element, clamping members each loosely mounted on the head on each side of the clamping element, cable clamping means carried by said members on each side of the clamping element of the head, and means for drawing the members together.

8. In a line clamp, a head having a cable clamping element, clamping members each loosely mounted on the head on each side of the clamping element, cable clamping means carried by said members on each side of the clamping element of the head, and means for drawing the members together, said last named means having an adjusting medium for engaging one of the members for adjusting said members to compensate for wear.

9. In a line clamp, a head having a cable clamping element, clamping arms provided with jaws having cable clamping elements co-acting with the clamping element of the head, and loose connections extending through the head and jaws of the arms for mounting said jaws on the head.

10. In a line clamp, a head having a cable clamping element, clamping arms provided with jaws having cable clamping elements co-acting with the clamping element of the head, loose connections extending through the head and jaws of the arms for mounting said jaws on the head, and means for drawing said arms together.

11. In a line clamp, a head having a cable clamping element, and clamping arms provided with jaws having cable clamping elements co-acting with the clamping element of the head, bolts extending through the head and jaws of the arms for loosely mounting the jaws on the head, said jaws and head being loose on said bolts.

12. In a line clamp, a head having a cable clamping element, clamping arms provided with jaws having cable clamping elements co-acting with the clamping element of the head, bolts extending through the head and jaws of the arms for loosely mounting the jaws on the head, said jaws and head being loose on said bolts, and means for drawing said arms together to fasten the clamp on a line.

13. In a line clamp, a head having a cable clamping element on one side and concaved vertical bolt seats on its opposite side, clamping arms provided with jaws having cable clamping elements co-acting with the clamping element of the head, and T-shaped bolts extending through the head and the jaws of said arm, the heads of the bolts engaging in the seats of the head, said head and jaws being loosely mounted on said bolts.

14. In a line clamp, a head having a cable clamping element on one side and concaved vertical bolt seats on its opposite side, clamping arms provided with jaws having cable clamping elements co-acting with the clamping element of the head, T-shaped bolts extending through the head and the jaws of said arm, the heads of the bolts engaging in the seats of the head, said head and jaws being loosely mounted on said bolts, and means for drawing said arms together to fasten the clamp on a line.

15. In a line clamp, a head having a cable clamping element, clamping arms provided with jaws having cable clamping elements co-acting with the clamping element of the head, said jaws having convex faces engaging the head on each side of the clamping element thereof, and bolts carried by the head on which the jaws are loosely mounted to permit their convex faces to rock on the head.

16. In a line clamp, a head having a cable clamping element and diverging faces on each side of said element, said head having teeth and sockets on said faces and clamping arms provided with jaws having cable clamping elements co-acting with the clamping element of the head, the jaws of the arms having convex faces co-acting with the faces of the head and teeth and sockets intermeshing with the teeth and sockets of the head, and bolts carried by the head on which the jaws of the arms are loosely mounted.

17. In a line clamp, a head having a cable clamping element, clamping arms provided with jaws having cable clamping elements co-acting with the clamping element of the head, swivel connections for mounting the head and jaws in assembled order, a lever carried by one of the arms, a gate pivoted on the outer end of the lever and engaging the other arm, a removable bushing mounted on the arm carrying the lever, and a screw threaded in the bushing and engaging the lever.

18. In a line clamp, a head having a cable clamping element, jaws having cable clamping elements co-acting with the clamping element of the head and swiveled on the head so as to undergo swinging movements in vertical planes as well as in a horizontal plane, the clamping elements of the head and jaws co-acting to spread to permit the passage of irregularities on a line passing through the clamp, and means for drawing the jaws together to engage the clamping elements with a line.

19. In a line clamp, a head having a cable clamping element, outwardly curved hooks on each side of the clamping element of the head, and jaws having clamping elements co-acting with the clamping element of the head and swiveled on said head, and lugs carried by the jaws and extending under the hooks in such close relation as to form keepers for retaining links and the like on the hooks.

In testimony whereof I affix my signature.

FRANK E. CROTTO.